Patented Aug. 31, 1943

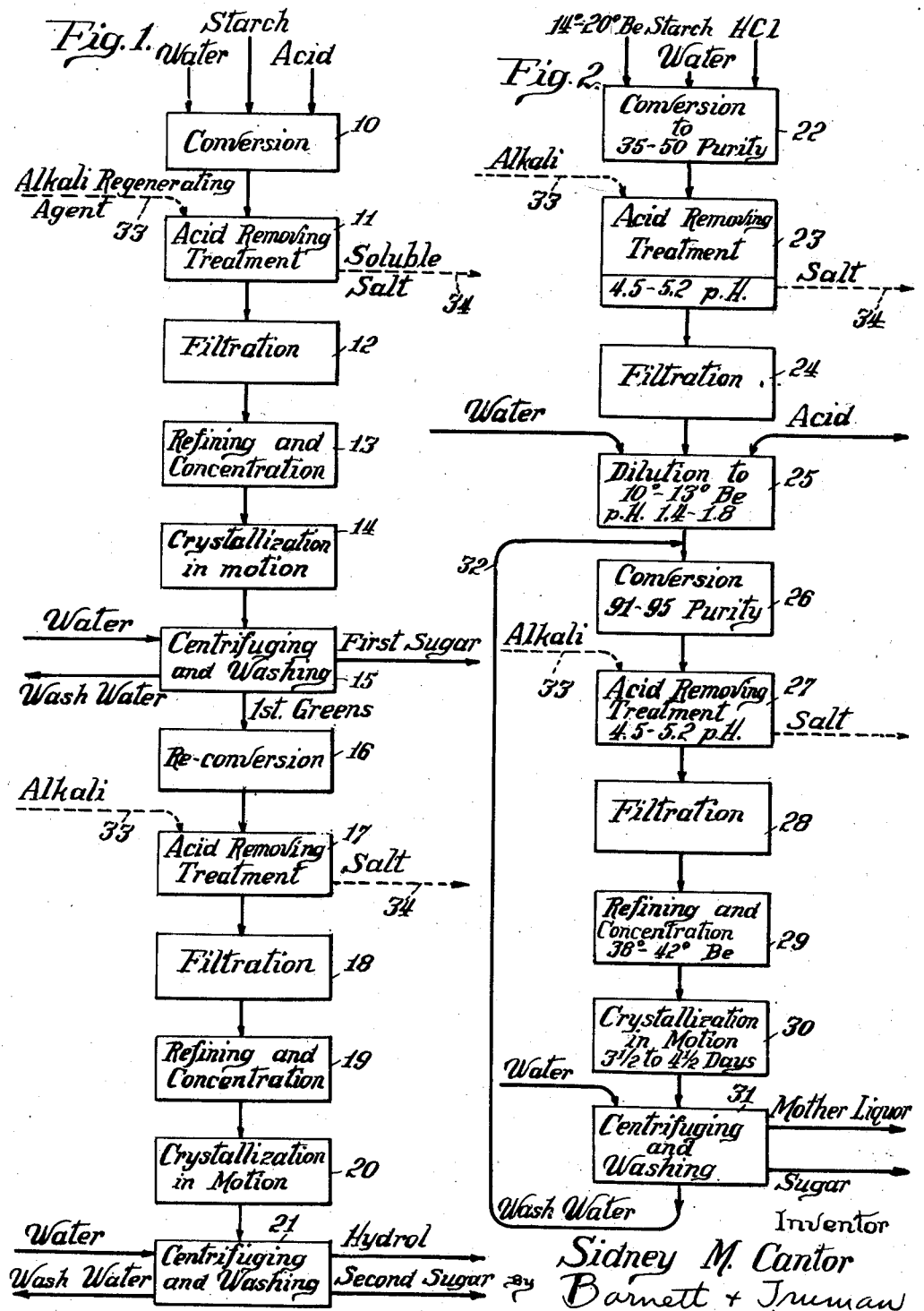

2,328,191

UNITED STATES PATENT OFFICE 2,328,191

STARCH CONVERSION PROCESS

Sidney Mark Cantor, Riverside, Ill., assignor to Corn Products Refining Company, New York, N. Y., a corporation of New Jersey Application March 20, 1940, Serial No. 325,036

5 Claims. (Cl. 127—40)

This invention relates to the conversion, by acid hydrolysis, of polymers of dextrose or other substances yielding dextrose, such as starch, cellulose, partially converted starch solutions (in the case of two-stage conversions) and mother liquors (in reconversion procedures), for the production of syrup, such as starch syrup commercially known as glucose, high purity crystalline dextrose, pressed dextrose sugars, and block or slab dextrose sugars, for example the so-called 70 and 80 corn sugars which contain all of the impurities of the converted liquors from which they are made.

In the production of these dextrose containing syrups and dextrose or dextrose containing sugars it has been customary for many years to neutralize the converted liquor with a sodium compound, usually sodium carbonate, in case the hydrolyzing acid is hydrochloric acid, which results in the formation in the liquor of the soluble salt, NaCl, which, because of its solubility, remains in the liquor throughout the remaining steps of the process and is present in the final product in the case of 70 and 80 sugars, and in the hydrol or final mother liquor, in the case of high purity crystalline dextrose.

The presence of the salt is objectionable for several reasons: it contributes to undesirable coloration of the sugar liquors and particularly of 70 and 80 sugars and hydrol; it tends to bring about an after crystallization in hydrol when the hydrol is shipped in tank cars or otherwise; it tends to inhibit the conversion of polysaccharides to dextrose in the conversion (referred to generally as reconversion) of mother liquors; and, more particularly, it acts as a catalyzer tending to bring about or to promote and facilitate, in the reconversion operation which consists in the depolymerization of higher molecular weight sugars back to dextrose, the polymerization of dextrose to such higher molecular weight sugars; both reactions taking place or tending to take place simultaneously in the reconversion operation or in fact in any converting operation of this character.

This heretofore customary method of neutralization by a sodium compound is especially objectionable in the case of repeated conversions, for example, when the conversion is interrupted, the liquor neutralized and impurities removed and then the conversion continued, in order to increase the final purity, as such procedure involves two neutralizations with resultant increase of salt content.

According to the present invention the acid is removed or eliminated from the liquor, in distinction to being neutralized, by treatment of the liquor with a substance, inert to dextrose, which will combine with the acid or acids in the liquor to form an insoluble salt or salts, in place of the soluble salt of the usual process, and which, because of its insolubility may be readily removed from the liquor or the liquor therefrom. Particularly suitable for the purpose of the present invention are amines of sufficiently high molecular weight so that they combine with the acids to form insoluble salts. The amine may be an alkyl, aryl, aralkyl or cyclic amine of the primary, secondary or tertiary type. By the term "amine" is meant any compound included in the generic formula $$R-N-X$$

wherein N stands for nitrogen, X for two, one or zero hydrogen atoms, and R for an alkyl, aryl, aralkyl or cyclic group, either substituted or unsubstituted, or any combination of these groups. Known examples of such compounds are the resinous condensation products of normal butyl amine, ethylenediamine, morpholine, triethanolamine, aniline and phenylmethylpyrazolone. These substances are available on the market and used for various industrial purposes.

The essential thing is that the amine and the resultant amine salt should be insoluble in water, so that the amine salt, which is an addition product of the amine and acid, may be removed from the converted liquor by filtration. Another essential is that the amine be inert toward sugar type compounds, dextrose for example. Any amine characterized as above will serve the purpose of the present invention, or in fact any substance which is inert to dextrose insoluble in a dextrose solution and which forms an insoluble addition product with acids may be employed.

An example of a suitable amine for the purpose is the resinous condensation product of m-phenylene diamine and formaldehyde which, with its method of production, is described in United States patent to W. H. Kirkpatrick, No. 2,106,486, patented January 25, 1938. This product may be considered as an amine, in the broad sense of the term intended herein, because its organic radical can be regarded as displacing hydrogen in ammonia. The term "amine" may be considered as including the aliphatic substance formaldehyde as well as the aromatic radical phenylene.

Another substance suitable for the purposes of this invention is the substance known an Anex, made by the International Filter Company, which substance is a resinous, water insoluble amine condensation product, inert to dextrose which will combine with acids to form an insoluble compound, and therefore comes under the formula R—N—X as given above.

Either of the condensation products referred to are water insoluble and will form an addition compound with the acid in an acid hydrolyzed starch converted liquor, which is water insoluble. Neither compound reacts with or otherwise affects dextrose in any substantial manner.

The present invention is based upon the further discovery that when the converting acid is removed from a dextrose containing converted liquor by one of the substances contemplated by the present invention, the treatment also removes amino acids, in the form of insoluble salts, which under the old process were neutralized as soluble salts.

Experiments have demonstrated that the amount of protein and the amount of color in a converter liquor treated with the acid removing substance of the present invention are very considerably less than the protein and color in a liquor neutralized with an alkaline sodium compound. The following appears to be the explanation for this:

Starch employed for conversion contains a small amount of protein. The protein is ordinarily not completely separated from the starch by the starch tabling and washing operations. This residual protein is one of the chief contributors to color in starch converted liquors, particularly after the first converting operation on the starch, for example, during ordinary neutralization, concentration and subsequent converting operations, if any. It is believed that the color formation is caused by the reaction of amino acid with dextrose or dextrose dehydration products, for example, 5-hydroxymethylfurfural forming amino acid condensation products. The latter are known to be dark colored products. The amino acids in converter liquors are produced from the protein in the starch by the hydrolytic action of the converter acid, the intended function of which acid is, of course, the hydrolyzation or conversion of the starch to dextrose.

According to the present invention the hydrolyzed protein in the form of amino acids is removed by the converting acid removing substance which will react with these amino acids in the same way as it reacts with the converting acid to form insoluble salts removable by filtration. Tests show that the amine is capable of removing about 60% of the protein present in the converter liquor. Preferably, the treatment for removal of the amino acids (as well as the other acid) follows as closely as possible the converting operation for the reason that the reaction between the amino acids and the dextrose or dextrose dehydration products tends to occur as soon as and wherever these substances are in contact with each other.

The substitution of the acid removing treatment of the present invention for the usual neutralizing step makes it possible to omit the usual mud centrifugals used to prepare the converted liquor for filtration. The reason for this is not altogether clear but is probably due to the change in the iso-electric point of the colloids brought about by partial removal of the amino acids. Applicant's process is advantageous in the case of processes involving a single conversion. It has greater advantages, over the alkali neutralization procedure, where the converted liquor is subjected to reconversion since each conversion, when followed by alkali neutralization, adds to the quantity of soluble salt in the liquor, in the final products, and in fact, in all stages of the process particularly where, as is now customary in the production of high purity, crystalline dextrose, melted, unwashed second or third sugars are mixed with the original converted liquor.

The effect of the herein disclosed method of acid removal is particularly marked under these circumstances. For example, where first greens are to be reconverted and recrystallized, the color in the first greens, treated by the process of this invention, is so greatly reduced, in comparison with first greens neutralized with sodium carbonate, that the second sugar produced from the recrystallized first greens is almost equal in quality, particularly as to color, to a first sugar, so that this second sugar, instead of being remelted and recrystallized, as has been customary, may be sold as a high quality sugar.

It is necessary at intervals to regenerate the amine or other acid removing substance. This can be done by treating it with an alkaline solution, such as a ½% to 2% caustic soda or carbonate of soda solution, which disassociates the acid from the amine addition product in the form of a soluble salt which is then washed out of the amine substance with water.

The invention is illustrated in the accompanying flow sheet in which

Fig. 1 illustrates the application of the invention to a two-conversion process in which the second sugar is a high purity sugar; and Fig. 2 its application to a process in which the conversion of starch is interrupted; the converting acid, amino acids and other non-carbohydrate substances being removed by treatment in accordance with this invention, and the liquor reconverted to a purity higher than would be possible under similar conditions by a single conversion.

The process illustrated in Fig. 2 may be regarded as an improvement upon the process of United States Patent No. 1,876,883, September 13, 1932, to Ebert et al. In the Ebert et al. process the neutralization of the converted liquor at two stages brings about an undesirable increase in salt content and color in the converted liquor and in the products derived therefrom.

Referring to Fig. 1, 10 designates the conversion step of the process which may be carried out in the usual autoclave into which is introduced the dextrose polymer, starch for example, water and acid. The converted liquor is passed through a granular mass of the acid removing substance as indicated at 11, and the liquor from this step is then filtered at 12, ordinarily without centrifuging in the usual mud centrifugals. The liquor is kept in contact with the granular bed at 11 until the usual pH of 4.5 to 5.5 is reached, the insoluble salts remaining in the granular bed. The filtration at 12 is for the purpose of removing fatty acids and other non-carbohydrate material. The filtered liquor may then be refined and concentrated as indicated at 13. The refining involves ordinarily an adsorption treatment over bone black or by admixture of activated vegetable carbon followed by filtration; and the adsorption operation, as well as concentration, may be carried out in two stages, each concentration being followed by adsorption treatment.

The conversion may be to the so-called glucose stage, if the end product is to be a starch syrup, or it may be carried to a higher "purity," and subsequently crystallized either for high purity crystalline dextrose or for the production of 70 or 80 or other dextrose sugar.

Assuming as an illustration that the process involves conversion of starch and the production of high purity crystalline dextrose, the process will be substantially as follows: 11° Baumé starch liquor (10°–13° Baumé) is introduced into the autoclave 10 with enough hydrochloric acid to give the liquor a pH of 1.5 (1.4–1.8) and the starch converted for 20 minutes (15–30 minutes) after about 45 pounds steam pressure has been reached, or until the purity (reducing sugar calculated as dextrose) is about 90. The converted liquor is then run through a column or tower 11 containing the acid removing substance in granular form until enough acid has been removed to give the liquor a pH of 5.0 (4.5–5.5); whereupon the liquor is filtered at 12, in any suitable type of filter or filter press. The filtered liquor is then concentrated in a vacuum pan to 26° Baumé (25°–28° Baumé), is passed through bone char filters, concentrated in a finishing pan to 39° Baumé (37.5°–41.5° Baumé) and is again put through bone black, these operations being indicated at 13, and is finally introduced into the crystallizer 14 and crystallized in motion according to the general principles of the processes described in United States patents to William B. Newkirk, No. 1,471,347, granted October 23, 1923, No. 1,508,569, granted September 16, 1924, and No. 1,521,830, granted January 6, 1925, on which the herein described process is an improvement. The massecuite is centrifuged at 15 to remove mother liquor and the crystals washed in the centrifugal machine. One of the advantages of the present invention is that the crystallizing period is considerably shortened.

The mother liquor may be reconcentrated (if desired after reconversion) and then crystallized for a second yield of dextrose, which because of its high purity and good color, due to the present acid removal treatment, may be marketed as such; or it may be melted and mixed with fresh converter liquor at 10 as the process proceeds in accordance with usual current practice.

The reconversion step is indicated at 16 with the liquor acidified to a pH of 1.6 (1.6 to 1.9) and converted for 18 minutes (15 to 20 minutes), after a steam pressure of about 45 pounds has been developed in the autoclave, or until the purity is about 90. The reconverted liquor is then run through a column or tower 17 containing the acid remover until enough acid has been removed to give the liquor a pH of 5.0 (4.5 to 5.5) whereupon the liquor is filtered at 18, refined and concentrated to 39° Baumé (37.5 to 41.5° Baumé) at 19, crystallized in motion at 20 and centrifuged and washed at 21.

The second sugar produced by this operation will, because of the method of acid removal in place of the usual neutralization, be of such high purity and brilliant color as to make it saleable as a high quality dextrose. Because improvements in the process of making crystalline dextrose have resulted in the removal of larger quantities of dextrose from the converted liquor in the first crystallizing operation leaving a poorer first greens for the second crystallization, which yields a more or less impure and colored second sugar, it has been the custom for some time to melt the second sugar and return the melt to the first crystallization, particularly where color is increased by employment of the reconversion step.

One of the advantages of the present process is that a second sugar may be produced which in purity and color compares favorably with first sugars.

The two-stage conversion process illustrated in Fig. 2 may be described as follows:

18° Baumé starch liquor (14°–20° Baumé) with sufficient hydrochloric acid to give the converter liquor a pH of 1.5 (1.4–1.8) is converted in the autoclave 22 at 45 pounds steam pressure for 8 minutes (5–10 minutes) or until a purity of 40 (35–50) is obtained. The converted liquor is then passed through a bed of the acid remover, at 23, until sufficient acid has been removed to raise the pH to 5.0 (4.5–5.5), after which the liquor is filtered at 24, diluted with water at 25 to 12° Baumé (10°–13° Baumé), and re-acidified with hydrochloric acid to a pH of 1.5 (1.4–1.8). The liquor is then converted as indicated at 26 at 45 pounds steam pressure for 9 minutes (8–10 minutes) or until a purity of 95 (91–95) is obtained; whereupon the treatment with the acid remover is repeated at 27 to give the liquor a pH of 5.0 (4.5–5.5), the liquor filtered at 28, refined and concentrated at 29 to a density of 39° Baumé (38°–42° Baumé) and crystallized in motion at 30, the crystallizing operation requiring only about 4 days (3½ to 4½ days) instead of the usual 5 or 6 days. The massecuite is centrifuged at 31, the crystals washed with water in the centrifugal machine and the wash water returned, through conduit 32, to either the first conversion at 22, or, preferably, to the second conversion at 26. The mother liquor discharged from the centrifugal machines may be treated, with or without reconversion, for a second yield of crystal sugar.

In any process according to the present invention, it will be necessary to regenerate the acid removing substance at intervals to disassociate therefrom the added acid. Referring to Figs. 1 or 2, this may be accomplished by stopping the process, and passing an alkali regenerating agent, for example, a dilute caustic soda solution, introduced at 33 through the bed of the amine substance. The caustic soda combines with the acid added to the amine forming a soluble salt which is discharged at 34. Theoretically any alkaline compound may be used for disassociating the acid from the amine. Sodium compounds are preferable since they form soluble salts with the acid.

Instead of using hydrochloric acid for the conversion, any other usual converting acid may be used such as sulfuric acid. While it has been more usual to employ hydrochloric acid for starch conversion than sulfuric acid, there is a substantial advantage in employing sulfuric acid when the acid removing process of the present invention is used, for the reason that the acid removing material will remove a larger quantity of sulfuric acid, due to the fact that it is less highly ionized than hydrochloric acid and therefore combines better with the acid removing substance.

Sulfuric acid has been used as a hydrolyzing acid in the conversion of starch to dextrose and intermediate products. In such case it was customary to neutralize the sulfuric acid with a calcium compound such as calcium carbonate or calcium hydroxide. This gave a salt which was partly, but not entirely, insoluble in the converted, or partially converted, liquor. The insoluble portion was, of course, filtered off. However, as the solution was concentrated, in respect to its sugar content, in the further steps of the process, the solubility of the soluble portion of the salt was reduced so that fine particles of insoluble calcium sulfate, known as gypsum haze, were precipitated, which particles because of their fineness could not be removed from the concentrated liquor, practically, by a filtering operation. Applicant's process is, therefore, essentially different from the process of using sulfuric acid and neutralizing with a calcium compound, since in applicant's process the salt is insoluble at all dextrose concentrations. This is what is meant herein by the term "insoluble" as applied to applicant's combination of acid and acid removing substance.

The term "converted liquor," or equivalent phrase, as used herein, includes a partially converted liquor, as in the production of starch syrups, as well as a liquor in which the conversion to dextrose is carried as far as possible, as is usual in the production of high purity crystalline dextrose or lower purity dextrose sugars.

The two-stage conversion makes it possible to use the higher initial gravity indicated. This results in a higher purity liquor for conversion and a higher yield, without the usual disadvantage of increased salt content in the final hydrol.

The examples of the application of the invention to practice given above are to be considered as merely informative and typical. The intention is to cover all equivalent processes and all modifications of the disclosed processes within the scope of the appended claims.

It has been proposed to remove the salt, due to alkali neutralization, from hydrols and other dextrose containing liquors by dialysis. Applicant's invention obviously makes such procedure unnecessary.

Other advantages of the improvement constituting the present invention may be summarized as follows: increased purity of the neutralized liquor and of the final product; reduced color in the product; increased yield in the case of high purity crystalline dextrose production; an 80% reduction of salt in the hydrol whereby the tendency of the hydrol to crystallize in storage or transit is decreased; employment throughout the process of higher purity liquors, especially in processes involving repeated conversions and crystallizations yielding, for example, a second sugar of almost as high purity as the first sugars; shortening of the crystallizing time, more particularly in processes involving two-stage conversions; increased production of dextrose more pronounced when mother liquors are reconverted; and elimination of one step of the refining process, viz., separation of mud by centrifuging.

I claim:

1. In the art of producing dextrose, or dextrose containing products, by the acid conversion of dextrose polymers, the improvement which consists in bringing the converted liquor into contact with an amine, represented by the formula

wherein N stands for nitrogen, X for 0 to 2 atoms of hydrogen, and R for a member of the class consisting of alkyl, aryl, aralkyl and cyclic groups of the primary, secondary and tertiary types substituted and unsubstituted and combinations of these groups, which amine is inert to dextrose and of sufficiently high molecular weight to be capable of forming an insoluble compound with acid in the converted liquor; and effecting a removal between said insoluble compound and said converted liquor, whereby acid is removed from said converted liquor.

2. The process of claim 1 in which the converted liquor is caused to pass through a granular bed of amine for the purpose of bringing about the reaction between said amine and the acid in the converted liquor.

3. The process of claim 1 in which the converted liquor, after removal of acid, is refined, concentrated and crystallized, and the dextrose removed therefrom in a crystalline state and at high purity.

4. In the treatment of acid-containing dextrose polymer hydrolysate liquor, bringing the liquor into contact with a substance represented by the formula R—N—X, wherein N stands for nitrogen, X for 0 to 2 atoms of hydrogen, and R for a member of the class consisting of alkyl, aryl, aralkyl and cyclic groups substituted and unsubstituted and combinations of these groups, which substance is inert to dextrose and of sufficiently high molecular weight to be capable of reacting with acid in the liquor to form insoluble material, and effecting separation as between the liquor and such material formed by reaction between the acid and said substance.

5. In the art of producing dextrose or dextrose-containing products by the acid conversion of dextrose polymers, the improvement which consists in bringing acid-containing dextrose polymer hydrolysate liquor into contact with an insoluble resinous reaction product of m-phenylene diamine and formaldehyde, which product is inert with respect to dextrose and capable of forming insoluble material by reaction with acid in such liquor whereby acid is removed from the liquor.

SIDNEY MARK CANTOR.